United States Patent [19]
Lind et al.

[11] Patent Number: 5,766,485
[45] Date of Patent: *Jun. 16, 1998

[54] COLOR REMOVAL FROM EFFLUENT WATERS

[75] Inventors: Christopher Bruce Lind, Syracuse; David Kisling Kennedy, Constantia, both of N.Y.

[73] Assignee: General Chemical Corporation, Parsippany, N.J.

[*] Notice: The terminal 12 months of this patent has been disclaimed.

[21] Appl. No.: 468,208

[22] Filed: Jun. 6, 1995

[51] Int. Cl.$^6$ ................................................. C02F 1/56
[52] U.S. Cl. .................. 210/711; 210/725; 210/727; 210/734; 210/917; 210/928; 162/189
[58] Field of Search ................................ 210/711, 725, 210/727, 728, 734, 917, 928; 162/189, 190

[56] References Cited

U.S. PATENT DOCUMENTS

| | | | |
|---|---|---|---|
| 3,578,587 | 5/1971 | Kemmer | 210/917 |
| 3,627,679 | 12/1971 | Fuller | 210/45 |
| 3,901,804 | 8/1975 | Ohuchi et al. | 210/711 |
| 3,953,330 | 4/1976 | Tonkyn et al. | 210/736 |
| 3,959,133 | 5/1976 | Fulton | 210/711 |
| 4,089,780 | 5/1978 | Suarz et al. | 210/917 |
| 4,448,696 | 5/1984 | White | 210/711 |
| 4,738,750 | 4/1988 | Ackel | 210/711 |
| 4,761,239 | 8/1988 | Wardell | 210/727 |
| 4,851,128 | 7/1989 | Rose | 210/917 |
| 5,200,089 | 4/1993 | Siefert et al. | 210/928 |

OTHER PUBLICATIONS

Fuller et al, "Operating experience with an advanced color removal system" Tappi, vol. 59 No. 9, Sep. 1976 pp. 66–70.

Primary Examiner—Peter A. Hruskoci
Attorney, Agent, or Firm—Arthur J. Plantamura

[57] ABSTRACT

Alum process residues (APR) are used to remove colored contaminants from waste waters. In addition, in accordance with the invention, up to 0.1% by weight of alum and up to 5 ppm of a polyelectrolyte polymer is added to improve color removal, turbidity removal and the settling rate. The resultant APR-alum-polymer mixture together with contaminants in the waste water settles rapidly, reducing the costs of the color removal process.

9 Claims, 1 Drawing Sheet

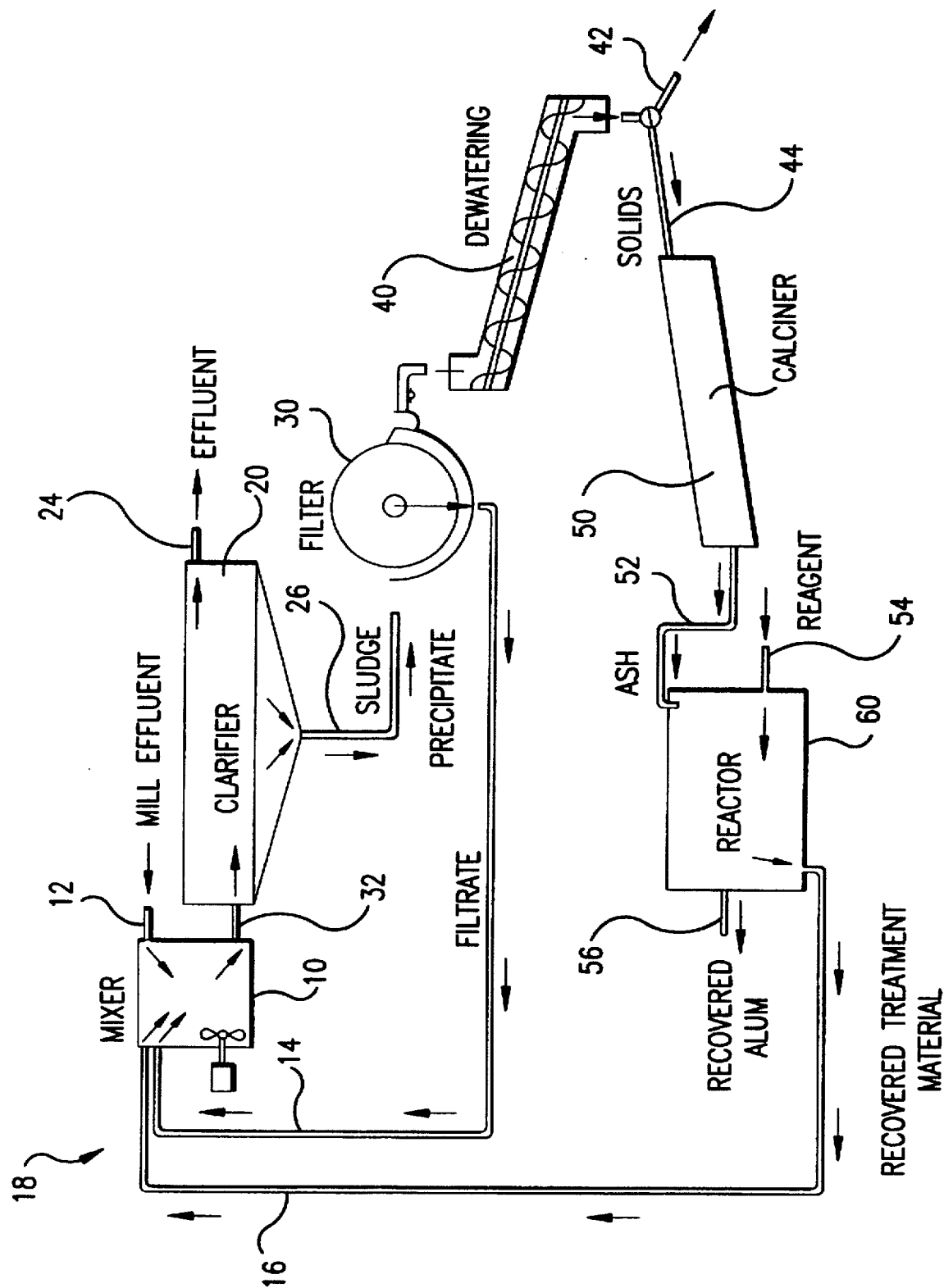

COLOR REMOVAL FROM EFFLUENT WATERS

This invention relates to the treatment of waste water effluents to reduce their color. More particularly, this invention relates to the treatment of aqueous effluents from pulp and paper mills to reduce color bodies prior to discharge into public waterways.

BACKGROUND OF THE INVENTION

In the manufacture of paper products, wood pulp is digested to dissolve non-cellulosic fractions to free the cellulose fibers therefrom. The cellulose fibers are removed in a comparatively pure state and are washed several times, producing aqueous streams containing the digestion chemicals, lignins from the digestion stream, and the like.

These aqueous solutions contain many different materials, including sugars, lignin compounds, digestion chemicals and the like. If the cellulose fibers are bleached as part of the manufacturing process, the wash solutions may contain chlorine-containing compounds, free HCl residues, NaOH neutralizer residues and the like as well. Also, the paper plant may use dyes, fillers, chemical polymers, starch, size, alum, vegetable and synthetic gums and/or other additives used in the paper manufacturing process. Additionally, the incoming wash water may be treated with alum, polymers, silicates and the like. When all of the manufacture and wash water streams are combined, the water contains large volumes of many materials. For example, a mill that produces 500 tons of paper per day can produce 20 million gallons/day of effluent streams. Further, the type and amount of materials in the effluent streams varies from one plant to another, depending on the origin of the water, type of pulp and paper produced, and the like.

Thus various types of treatment of the effluent streams have been tried to remove these materials from the water prior to discharge. Suspended solids can be readily removed, and organic materials that use up oxygen, that is, that have a high biochemical oxygen demand (BOD), can also generally be removed using existing technologies. However, color bodies are more difficult to remove. Thus, even if the water has been so treated, it may be highly colored, even very dark-brown, which is highly objectionable to the public and impairs down-stream uses of the resulting water.

Some color bodies (aquatic humic substances, natural organic matter and synthetic organic carbon compounds) are in suspension in pulp mill effluents, and these bodies can be removed by conventional precipitation techniques. However, other of the color bodies are in true solution, and these are more difficult to remove.

Various techniques have been tried in attempts to remove organics and color from paper and pulp effluent waters, but they have proved to be too expensive. For example, treatment with lime, Fuller's earth, ion exchange resins, activated carbon, UV light, ozone and the like range in cost from $10 to well over $25/ton of pulp produced, which is too expensive, and, therefore, they have not been widely adopted by the industry. Further, there are high capital costs for some of the suggested methods as well. Thus few pulp and paper mills are practicing color removal at present. However, increasingly stringent regulations of environmental laws, both local and federal, require continuing research in this area.

Fuller, as described in U.S. Pat. No. 3,627,679, developed a process to remove color bodies in pulp mill waste waters. In accordance with his process, the waste water is mixed with alum process residues (APR), an aluminum sulfate-containing by-product of aluminum manufacture. APR is the product that remains after removal of aluminum from bauxite and high alumina-content clays with sulfuric acid. These APR particles are highly irregular in shape and have large surface areas which can adsorb color bodies. Since some aluminum ions are still present in the APR, the color bodies are precipitated from solution to form a dense, low volume sludge. The stirred waste water is allowed to settle, and the supernatant liquid, now much lighter in color, can be discharged into local waterways. The sludge remaining at the bottom of the mixing tank is withdrawn, filtered, and the solids dewatered. The solids can be pressed to remove further amounts of water. The dewatered solids are calcined, when the organic materials are decomposed, leaving an ash. This ash can be reconstituted to alum, as with sulfuric acid, and recycled to remove additional color bodies from a fresh batch of effluent water.

The Fuller process has not been adopted widely because of (1) the length of time it requires to settle out the APR-waste water mixture in the mixing tank; (2) the marginal water color improvement obtained thereby; and (3) because of mechanical difficulties associated with the filtration of the resultant dilute APR mixture.

Thus a method of removing color bodies from effluent waste waters that is inexpensive and efficient would be widely adopted if available, and the search for such a process has continued.

SUMMARY OF THE INVENTION

We have found that the addition of polyelectrolytes and water-soluble polymers aid in the color removal process and increase the sedimentation rate of solid particles in waste waters. APR is added to the waste water to be decolorized, and, optionally, additional alum which can be mixed with cationic polymers is also added. Lastly a low charge anionic or nonionic polymer is added, the mixture stirred for a short time, and allowed to settle. The addition of the anionic or nonionic polymer also improves removal of organo-halides (AOX) from the waste waters.

BRIEF DESCRIPTION OF THE DRAWING

The Figure is a flow sheet showing the various stages of the present process.

DETAILED DESCRIPTION OF THE INVENTION

The Fuller process is followed herein except for the addition of one or more polymeric additives during the mixing step. Waste waters from pulp and paper mills are generally highly colored, from a yellow color to a very dark-brown color. The present process will be explained by reference to the Figure.

In a first step, the effluent waters are fed through line 12 into a mixer 10 and are stirred together sequentially with APR, optionally adding alum which can be mixed with cationic polymers as needed, and up to about 5 ppm by weight of anionic or nonionic polymer particles to absorb the color forming bodies in the effluent water. The pH is adjusted to a pH of 7 or less, preferably to about 5.3–5.5. After stirring in the mixer 10 for a period of a few minutes or so, the stirring is stopped, and the mixture is transferred to a clarifier tank 20 where the solids are allowed to settle out of solution. The addition of the anionic or nonionic polymer during the mixing step in accordance with the invention markedly increases the settling rate, even of colloidal particles, thereby greatly improving the economics of the present process over the prior art Fuller process. In general, the supernatant liquid from which the color bodies have been removed can be decanted through line 24 after only a few minutes. This rapid and simple treatment results in reducing the color of the effluent stream from a deep-brown color to a pale yellow, the color of ginger ale.

The solids remaining in the tank are recovered through line 26 and filtered in filter 30 to remove additional water. This water is removed through line 14 and can be recycled if required to improve its color, or to further reduce AOX content and the like, to the mixer 10. The solids can be further dewatered, as with a screw press 40, to squeeze further water from the solids. This water is drawn off through line 42 for land disposal. The solids can be transferred through line 44 to the calciner 50. The dewatered solids are then burned in the calciner 50 to destroy most of the organic material in the solids, both organics from the effluent waters and from the added polymeric material. Suitably the solid material is heated to a temperature of 300° C. or higher during this step.

The ash remaining from the calciner is removed through line 52 and can be reconstituted in the reactor 60, as by treatment with sulfuric acid added in line 54, to form alum which can be recycled, at least in part, to the mixer 10 through line 16. Excess aluminum values can be recovered as aluminum sulfate solution, which can be removed through line 56.

We have found that the recycled alum, devoid of polymers or polyelectrolyte adjuncts, cannot be used alone in the present process, but fresh APR is required. A small amount of recycled alum, optionally mixed with a cationic polymer, can be added to APR to further improve efficient color removal. The APR solids preferred as the starting material herein is a by-product of alum manufacturing. It contains up to about 5% of alum or higher. The solids are mixtures containing silica, alumina and oxides of iron, titanium and zirconium. The solid particles, after having the aluminum values extracted therefrom, have irregular surfaces which can trap suspended color bodies from solution.

Preferably one or more polymers are employed herein, including cationic, and/or nonionic polymers. An anionic polymer is also added, which can include a high molecular weight, low charge, anionic polymer. Such polymers are typically added in amounts up to 5 ppm based on the water treated.

Although the exact mechanism of the present process is not known with certainty, it is believed that the alum-derived compounds formed in situ in the water undergoing treatment, which are cationic, attract particles having an opposite charge, and aid in the rapid coalescence of colloidal particles including color bodies. The presence of acid protons aids in this process also, and thus the pH is preferably maintained in the acid range. However, as further shown below, the rate of settling is fairly low. The anionic polymer additive is believed to attract cationic particles, bonding or bridging them together. Thus the combination of alum, with or without cationic polymer, which attracts particles, and the anionic polymer particles, that form bridges between cationic-formed particles, results in rapid coalescence and precipitation of colloidal color-bearing particles. Thus the speed of coalescence is markedly increased from hours to minutes, and the total amount of coalescence that occurs is also increased by the use of a combination of APR and anionic polymeric particles. The presence of the anionic polymer also helps in the separation of solids and liquid in the later, dewatering stage.

The invention will be further illustrated in the following examples, although the invention is not meant to be limited to the details set forth therein. In the examples, color is given in color units as determined using a Hach DR/2000 calorimeter at 450 nm. Turbidity is given in nephalometric turbidity units (NTU).

EXAMPLE 1

A series of test runs was made using 2.5 liter samples of waste water from a kraft paper plant, which had a pH of 8.27. APR containing 12.4% of solids was added first, followed immediately where indicated in Table I by addition of aluminum sulfate (alum). Then after 30 seconds, one ppm of Percol® E10 polymer, a polyacrylamide polymer commercially available from Allied Colloids Corp., was added to each of the samples, and the pH was adjusted with sulfuric acid to a pH of about 7.0. The samples were mixed for one minute and then were allowed to settle for five minutes. The supernatant waters were evaluated for color, turbidity and AOX content. Color and turbidity were measured before and after filtering. Absorbable organo-halides (AOX) were determined by a contract laboratory. The "Control" is the untreated water. The results are given below in Table I.

TABLE I

| Sample | APR/ or Clay ppm | Added Alum ppm | Unfiltered | | Filtered | | |
| --- | --- | --- | --- | --- | --- | --- | --- |
| | | | Color CU | Turbidity NTU | Color CU | Turbidity NTU | AOX, ppm |
| Control | — | — | 2050 | 132 | 840 | 3.90 | 16.0 |
| 1 | 1000 APR | — | 425 | 23.8 | 187 | 0.64 | 11.8 |
| 2 | 1000 APR | 50 | 478 | 26.9 | 185 | 0.56 | — |
| 3 | 1000 APR | 100 | 317 | 19.0 | 183 | 0.64 | — |
| 4 | 1000 APR | 200 | 212 | 9.5 | 159 | 0.49 | 7.2 |
| 5 | — | 200 | 1280 | 65.9 | 309 | 0.32 | 8.8 |
| 6 | 1000 Clay | 200 | 1480 | 92.2 | 328 | 1.56 | 9.7 |

The samples show a dramatic decrease in turbidity and color after treatment with a sufficient amount of both APR and anionic polymer. Similar reductions in absorbable organic halides (AOX) were also observed. APR alone does not provide sufficient color removal or settling rate. The addition of a little extra alum, although optional, aids in the additional reduction of color and turbidity.

EXAMPLE 2

One liter samples of kraft mill effluent were studied further. Each sample was stirred together with various reagents as described above including APR, alum and Percol® E10 polymer. The pH was adjusted with sulfuric acid and, after stirring as above, allowed to settle. The supernatant liquid was measured for unfiltered absorptivity (clarity) using a Hach Turbidimeter. The results are summarized below in Table II.

TABLE II

| Sample | APR ppm | Alum ppm | Percol E10 ppm | pH | Unfiltered Absorptivity, ABS |
|---|---|---|---|---|---|
| Control A | — | — | — | 6.8 | 1.500 |
| Control B | 1000 | — | — | 5.4 | 0.218** |
| 1 | 1000 | 10 | 0.5 | 5.4 | 0.117 |
| 2 | — | 30 | 0.5 | 5.3 | 0.998 |
| 3 | 1000* | — | 0.5 | 5.4 | 0.112*** |

*2 hour stir
**Very slow settling
***Settled in less than one minute

Thus the combination of all three additives including APR, alum and E10 polymer produced the best supernatant clarity and settling rate, compared with the omission of any one of these three additives.

EXAMPLE 3

A comparison was made changing the order of addition of fresh APR and the E10 anionic polymer, the pH adjusted as in Example 1, and otherwise following the procedure of Example 1, except that added alum was not used for the sake of simplicity. The results are summarized below in Table III.

TABLE III

| Added First | Added Second | Unfiltered Absorptivity, ABS | Comments |
|---|---|---|---|
| 1000 ppm APR | 0.5 ppm E10 | 0.107 | <1 min to settle |
| 0.5 ppm E10 | 1000 ppm APR | 0.194 | slow to settle |

Thus, reduced settling time was achieved when the APR is added to waste waters first, following by addition of the anionic polymer.

Although the present invention has been explained in terms of color removal from paper making waste waters, other waters and/or waste waters and reagent solutions can also be similarly treated. Additional sedimentation aids can also be added, as will be known to one skilled in the art. Thus the invention is only meant to be limited by the scope of the appended claims.

We claim:

1. A method of reducing color from waste effluent water from pulp and paper making comprising the following steps in sequence:

a) adding to said waste water an alum process residue (APR) by-product derived after aluminum has been removed from bauxite and high alumina content clays, said by-product containing alum and having particles, in an amount effective to adsorb soluble color bodies from said waste water;

b) adding to said waste water up to 0.1 percent by weight of aluminum sulfate (alum);

c) adding to said waste water from about 0.1 up to 5 parts per million of a nonionic or anionic polyelectrolyte polymer to increase the rate and effectiveness of sedimentation and color removal thereby producing a supernatant liquid layer from which the color bodies are removed;

d) adjusting the pH to about 7.0 or less; and e) separating the supernatant liquid from which the color bodies have been removed.

2. A method according to claim 1 wherein up to 0.5 percent of APR by weight of the waste water is added.

3. A method according to claim 1 wherein said polyelectrolyte polymer is an anionic polymer.

4. A method according to claim 1 wherein said anionic polymer is a polyacrylamide polymer.

5. A method according to claim 1 wherein said polyelectrolyte polymer is a nonionic polymer.

6. A method according to claim 1 wherein said alum is admixed with a cationic polymer.

7. A method according to claim 1 wherein said alum is admixed with sulfuric acid.

8. In an effluent treatment process comprising mixing a waste effluent from pulp paper making with alum process residues, a by-product derived after aluminum has been removed from bauxite and high alumina content clays, said by-product containing alum and having particles, in an amount effective to remove color bodies, clarifying the mixture, separating the solid material from the treated effluent, removing water from said solid material, calcining the solid material, reconstituting the solid material to form recycled alum and recycling to treat additional waste effluent, the improvement which comprises adding an anionic polyacrylamide polymer to said waste effluent after adding the alum process residues with or without alum and/or cationic polymer, adjusting the pH to about 7.0 or less, and separating a supernatant liquid which results from the waste effluent following addition thereto of the alum process residues.

9. A process according to claim 8 wherein, prior to adding the alum process residues, the pH of the water is adjusted to below pH 7.

* * * * *